United States Patent [19]

Boucher

[11] 3,814,867

[45] June 4, 1974

[54] ACTIVE SHUNT IMPEDANCE FOR COMPENSATING IMPEDANCE OF TRANSMISSION LINE

[75] Inventor: C. Wendell Boucher, Huntington Beach, Calif.

[73] Assignee: Communication Mfg. Co., Long Beach, Calif.

[22] Filed: Jan. 26, 1973

[21] Appl. No.: 326,594

[52] U.S. Cl. .......... 179/170 G
[51] Int. Cl. .......... H04b 3/18
[58] Field of Search .......... 179/170 G; 333/80

[56] References Cited

UNITED STATES PATENTS

| | | | |
|---|---|---|---|
| 2,844,669 | 7/1958 | Arndt | 179/175.31 |
| 2,878,325 | 3/1959 | Merrill, Jr. | 179/170 |
| 3,024,324 | 3/1962 | Dimmer | 179/170 |

*Primary Examiner*—Kathleen H. Claffy
*Assistant Examiner*—Mitchell Saffian
*Attorney, Agent, or Firm*—Christie, Parker & Hale

[57] ABSTRACT

An active shunt impedance compensating circuit for a two wire transmission line. A pair of output terminals connect across the transmission line. A negative impedance converter has a negative impedance circuit connecting side and a positive impedance connecting side. The positive impedance circuit connecting side is coupled across the pair of output terminals. First series connected resistance and capacitance impedance elements are connected across the negative impedance circuit connecting side. Second series connected resistance capacitance and inductance impedance elements are connected across the positive impedance circuit connecting side. A negative impedance converter is characterized, assuming an ideal transformation, for forming an equivalent circuit substantially equal to the negative of the first series connected impedance elements in parallel with the second series connected impedance elements.

20 Claims, 3 Drawing Figures

ACTIVE SHUNT IMPEDANCE FOR COMPENSATING IMPEDANCE OF TRANSMISSION LINE

BACKGROUND OF THE INVENTION

This invention relates to active shunt impedance compensating circuits for transmission lines.

Telephone transmission lines consisting of a non-loaded two wire line are connected between the central office and a subscriber. The two wire lines take on many formed and may be simple, consisting of a single gage of conductor or they may be complicated, containing two, three or four different gages. Bridged taps may be connected across the two wire line.

It is necessary to insure that the two wire transmission line has certain predetermined characteristics over the complete frequency range of use at desired points along the line. Typically, the telephone transmission line transmits frequencies in the range of 500 to 3,000 cycles. When an extremely long transmission line is used, it is necessary to boost the signals by providing gain circuitry along the line. It is also necessary to provide impedance matching circuitry at the junction between the main two wire transmission line and a subscriber loop to convert the relatively complex impedance of the telephone line to an effective impedance characterized as 900 ohms in series with 2 $\mu f$ capacitance to assure that the return loss will be minimized (maximum dB value).

Additionally complicating the overall problem is the requirement that the insertion loss of any added circuitry be minimized.

Circuits of various types have been proposed to achieve the aforementioned requirements. Some of these circuits employ negative impedance converters. A negative impedance converter is a circuit of the type described in the Proceedings of the IRE, June, 1953, pages 725 to 729, in an article by Linvill entitled "Transistor Negative-Impedance Converters."

One such device is manufactured by Western Electric Co. and is known as the E6 voice frequency repeater. The E6 voice frequency repeater is connected into the two wire transmission line by breaking the line and inserting the E6 series into the broken line. The E6 repeater provides gain by making use of two negative impedance converter circuits, one of which is a series-type converter and the other a shunt-type converter. The circuit provides a relatively flat gain over a frequency range of 500 to 3,000 cycles. A line build out (LBO) unit is also maufactured by Western Electric under the designation of the 830E. The 830E LBO is connected to the E6 in order to improve the impedance match between the input terminals of the E6 and the line connected to the central office. The 830E LBO converts the relatively complex impedance of the telephone cable to an effective impedance characterized as 900 ohms in series with 2 $\mu f$ capacitance. A disadvantage of the E6 converter is that it does not provide any correction for undesirable attenuation slope with frequency that is associated with the transmission system to which it is connected.

Turning to the 830E LBO, this device is an impedance and amplitude compensating network, and is used with the E6 repeater when the latter is connected to non-loaded cable. The 830E is shown and described in the Bell System Practices Manual, Section 332-206-125, Issue 1, October, 1970, AT&T Co. Standard. The 830E has numerous passive components which are varied by means of screw adjustments. The LBO provides an amplitude slope correction of 4 to 5 dB and provides a return loss of approximately 35 dB. However, the return loss is provided at the expense of insertion loss. For example, the insertion loss of the 830E LBO at 1 kHz is 6 to 8 dB, depending on the line configuration.

An alternate device made by the Western Electric Company is known as the E7 repeater. The E7 repeater is disclosed and described in the Bell System Practices Manual, Section 332-207-101, Issue 1, September, 1966, AT&T Co. Standard.

The E7 is basically an attenuation correcting device but does improve the impedance match. It also provides a small amount of gain if desired. The impedance matching function of the E7 repeater is poor compared with the E6 repeater and the available gain is much lower than that available in the E6. The E7 does not use any LBO's. Those components which adjust the gain of the E7 provide, in relatively poor manner, the compensation that an LBO would otherwise provide.

The E7 circuit is similar to the E6 repeater, in that it employs a negative impedance converter. The negative impedance converter is connected along with passive components to a two wire transmission line via a transformer. Like the E6 repeater, the transmission line must be broken and the E7 repeater is inserted into the line in series. At low frequencies, the negative impedance converter appears to be in series with the telephone line. At higher frequencies, the E7 repeater appears to be in shunt with the telephone line. This characteristic of the E7 repeater is provided primarily by the behavior of the transformer together with a capacitor joining the taps of the transformer. However, it should be noted that the transformer, which must be inserted in series with the line should exhibit low DC resistance and high inductance. To accomplish this, the transformer is made quite large, providing a very large and costly package.

Other series and shunt connected negative impedance converters of the E6 and E7 repeater type have been proposed for correcting transmission line impedance, e.g. see U.S. Pat. Nos. 2,878,325 and 3,042,759. However, these approaches suffer from the same disadvantages disclosed above for the other prior art.

SUMMARY OF THE INVENTION

Briefly, an embodiment of the present invention is an active shunt impedance compensating circuit for a two wire transmission line. A pair of output terminals are provided for connecting across a transmission line. A negative impedance converter has a negative impedance circuit connecting side and a positive impedance circuit connecting side. The positive impedance circuit connecting side is coupled across the pair of output terminals. First series connected resistance and capacitance impedance elements are connected across the negative impedance circuit connecting side. Second series connected resistance capacitance and inductance impedance elements are connected across the positive impedance circuit connecting side. The negative impedance converter is characterized, assuming an ideal transformation, for forming an equivalent circuit with impedance substantially equal to the negative of the first series connected impedance elements in parallel with the second series connected impedance elements across the output terminals. Preferably, each of the impedance elements are variable. For example, the use of switching circuits enable the various impedances to be varied so that the desired impedance characteristic for the transmission line is achieved. Thus it is possible to provide a standard U.S. transmission characteristic of 900 ohms resistance in series with two microfarads capacitance.

An alternate embodiment of the invention is a two wire transmission line in combination with an active shunt impedance compensating circuit of the type hereinabove described.

Broadly, the invention can be viewed in combination with a two wire transmission line having a predetermined frequency band of signal transmission. An active shunt impedance compensating circuit has a pair of output terminals for connecting across the transmission line. A negative impedance converter has a negative impedance circuit connecting side and a positive impedance circuit connecting side. The positive impedance connecting side is coupled across the pair of output terminals. A first impedance $Z1 = a_1(s + a_2)/s$ is coupled across the negative impedance circuit connecting side. A second impedance $Z2 = a_3(s^2 + a_4s + a_5)/s$ is coupled across the positive impedance circuit connecting side. In the foregoing, $a_1$ through $a_5$ are positive constants and s is equal to the complex frequency variable $J\omega$. The negative impedance converter is characterized, assuming an ideal transformation, for forming an equivalent circuit substantially equal to the negative of Z1 in parallel with Z2 and the parallel combination of Z1 and Z2 with the transmission line forms an impedance substantially equal to 900 ohms ($\Omega$) in series with 2 microfarad ($\mu f$) capacitance.

The aforementioned embodiments of the present invention are intended as a replacement for and perform the same function that the 830E LBO performs, but with improved characteristics. For example, depending on the line configuration, the slope correction produced by an embodiment of the afore-mentioned invention is between 5 and 6 dB over a frequency range of 300 to 3,000 cycles. This is significantly better than that provided by the 830E LBO. Additionally, an embodiment of the aforementioned invention provides a return loss of between 30 and 35 dB when connected to a cable of 19, 22, 24, and 26 gage lines. Of significant importance is that the aforementioned embodiment of the invention provides less than a 0.3 dB insertion loss at 1 kHz compared with the 6 to 8 dB loss provided by the 830E LBO when compared on a typical 22 gage cable.

Such a low figure of insertion loss is unusual and consequently produces another advantage over existing state of the art as follows. The return loss at the junction of a negative impedance repeater in the central office terminal is approximately equal to the return loss looking into the LBO of the negative resistance repeater minus two times the repeater gain in dB. Because the aforementioned embodiment of the invention has between 6 to 8 dB insertion loss advantage over the 830E LBO, the actual repeater gain for an embodiment of the invention can be reduced by 6 to 8 dB over the gain required for an 830E LBO. Since a gain of 6 to 8 dB degrades return loss by 12 dB to 16 dB and since the return loss of the aforementioned embodiment of the invention is approximately the same as the 830E LBO, there is a return loss advantage of the embodiment of the invention over the 830E LBO of between 12 and 16 dB. Additionally, an embodiment of the invention can be packaged in about one-third the volume of the 830E LBO due to the elimination of the large, bulky transformer.

The above mentioned embodiments of the invention involve a circuit that is somewhat similar to the active portion of the shunt negative impedance converter used in the aforementioned E6 repeater and the single negative impedance converter used in the E7 repeater. However, in contrast, the present invention involves a negative impedance converter that has in parallel with the positive impedance side a passive impedance circuit which adds attenuation to signals having frequencies below 1 kHz. Whereas, the negative impedance, as transformed by the negative impedance converter, is such that it adds gain to signals having frequencies above 1 kHz. This results in a varying amplitude correction that corrects such by about 5 dB. According to one embodiment of the present invention, the values of the impedances connected across the positive and negative impedance sides of the negative impedance converter are selected so as to provide the highest return loss figure while still correcting for the sloping insertion loss over the frequency of interest.

A number of additional advantages flow from the foregoing invention. By way of example, it is unnecessary to provide large transformers in series with the transmission line. In fact, it is unnecessary to break the transmission line at all because the active shunt impedance compensating circuit is connected in parallel across the line. Further, the active shunt impedance compensating circuit compensates for impedance while transmitting in either direction along the line. Additionally, an embodiment of the present invention can be placed any place along the line. Further, an embodiment of the present invention does not require that special networks be added on the terminating end of the transmission line cable.

By providing adjustable resistance capacitance and inductance impedances, adjustment can be made for a broad range of cable sizes and non-loaded cable links. For example, adjustment for 19, 22, 24, or 26 gage non-loaded cable up to 18,000 feet may be easily achieved. Longer loops may also be handled with minor performance degradation. This is in contrast to the aforementioned prior art devices.

DESCRIPTION OF THE PREFERRED EMBODIMENTS

Figure 1:
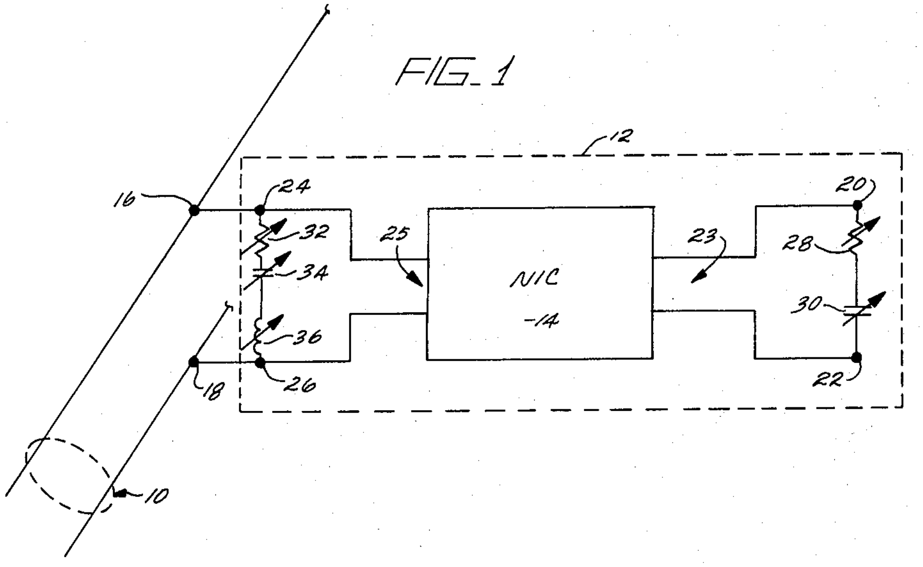
FIG. 1 is a block diagram of a telephone transmission system employing an active shunt impedance compensating circuit and embodying the present invention.

Refer now to the block diagram of FIG. 1 and embodying the invention. Shown are a two wire transmission line 10 and an active shunt impedance compensating circuit 12. The two wire transmission line 10 is connected between a central office (not shown) and a subscriber's loop (not shown) and is of the typical 2 wire transmission type found in U.S. telephone systems.

The active shunt impedance compensating circuit 12 (ASIC) has a pair of output terminals 16 and 18 connected across the two wire transmission line 10. A negative impedance converter (NIC) 14 has a negative impedance circuit connecting side 23 and a positive impedance circuit connecting side 25. The side 23 is connected across terminals 20 and 22 whereas the positive side 25 is connected across terminals 24 and 26.

The positive impedance circuit side 25 is also coupled across the terminals 16 and 18.

First series connected resistive and capacitive impedance elements 28 and 30 are connected across the side 23 and in between the terminals 20 and 22.

Second series connected resistive, capacitive and inductive impedance elements are connected across the positive impedance circuit connecting side 25 in between the terminals 24 and 26. The resistive, capacitive and inductive impedance elements 32, 34 and 36 are provided by variable resistor, variable capacitor and variable inductor elements.

Although the invention is not limited thereto, preferably the invention is employed in a system where the input impedance to the transmission line must be maintained to avoid reflections. This impedance in typical systems used in the United States today is typically characterized as 900Ω in series with 2 μf capacitance.

The system of FIG. 1 may be considered broadly, assuming an ideal transformation, as an impedance Z connected across the two wire transmission line 10 wherein $Z = Z1Z2/Z1 + Z2$;

$Z1 = a_1(s + a_2)/s$; and $Z2 = a_3(s^2 + a_4s + a_5)/s$ where $s$ = the complex variable $j\omega$ and $a_1$ to $a_5$ are positive constants. The values of the constants are selected by varying the elements 28 through 36 so that incombination with the two wire transmission line 10, an impedance characterized as 900Ω in series with 2 μf is formed at the point of connection to the transmission line.

Ideally, $a_1 = -R_{28}$, $a_2 = 1/R_{28}/C_{30}$, $a_3 = L_{36}$, $a_4 = R_{32}/L_{36}$, and $a_5 = 1/L_{36}C_{34}$ where $R$, $L$ and $C$ designate resistance, inductance and capacitance, and the subscripts affixed to the aforementioned R, L, and C terms are used to identify the corresponding numbered elements in FIG. 1.

Figure 2:
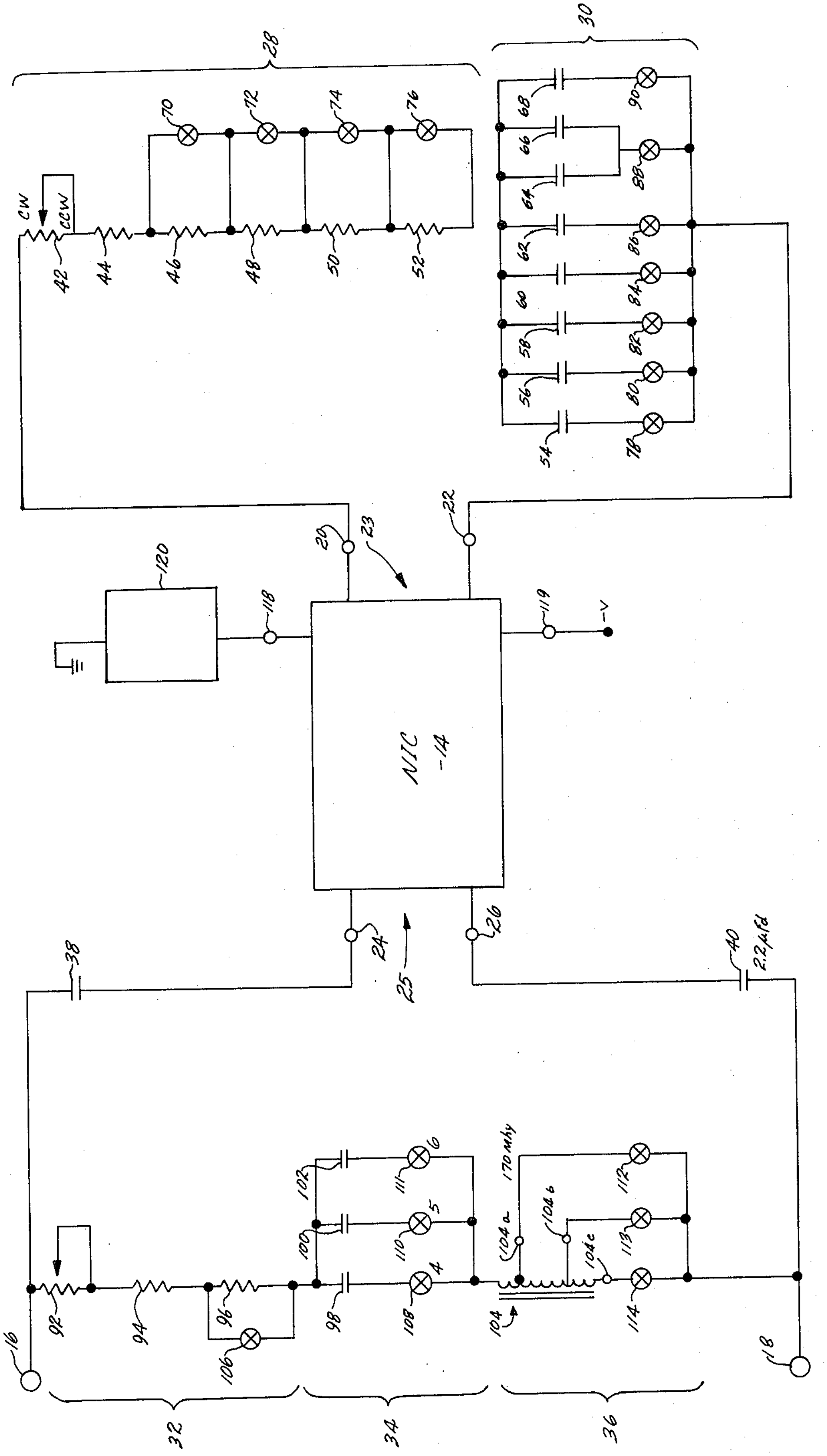
FIG. 2 is a schematic and block diagram of the active shunt impedance compensating circuit for use in the block diagram of FIG. 1 and embodying the present invention.

Refer now to the schematic and block diagram of FIG. 2 which shows a specific implementation of the block diagram of FIG. 1 and embodies the present invention. The variable resistive impedance 28 consists of the following: potentiometer 42, and resistors 44, 46, 48, 50 and 52 in combination with switches 70 through 76. The switches 70 through 76 are connected in parallel with the resistors 46 through 52, respectively. The potentiometer 42 has a wiper arm which is connected to one side of the potentiometer 42 to enable a fine adjustment of resistance.

The variable capacitive impedance 28 consists of capacitors 54 through 68 and switches 78 through 90. The capacitors 54 through 68 are connected in parallel in between one end of the variable resistive impedance 28 and the terminal 22. The switches 78 through 90 couple one end of the capacitors 54 through 68 to terminal 22.

The resistive impedance 32 consists of the series connection of a potentiometer 92, a resistor 94, a resistor 96 and a switch 106, the latter being connected in parallel with resistor 96. The wiper arm on the potentiometer 92 is connected to one end thereof and serves as a fine adjustment for resistance. The switch 106 can be used to short out the resistor 96, thereby providing a larger adjustment in resistance range.

The capacitive impedance 34 consists of three capacitors 98, 100, and 102 which are connected in parallel by means of switches 108, 110 and 111. The switches 108, 110 and 111 may be used to connect one or more of the capacitors 98 between one end of the resistive impedance 32 and one end of the inductive impedance 36.

The inductive impedance 36 consists of an inductor 104 having a core and taps 104*a*, 104*b*, and 104*c*. One end of the coil 104 is connected to the one end of the capacitive impedance 34. The switches 112, 113 and 114 can be used to selectively connect any one of the terminals 104*a*, 104*b* and 104*c*, respectively, into the corresponding series circuit.

The switches 70 to 90, and 106 to 114 may be mechanical or electronic switching elements well known in the switching art which provide either an open circuit or a short circuit connection as described hereinabove.

Capacitors 38 and 40 are connected between the terminals 24 and 16, and 26 and 18, respectively. The capacitors 38 and 40 couple signal frequencies from the transmission line 10 to the NIC 14 but block out direct current signals. Their value helps determine the negative impedance generated at terminals 16 and 18.

Figure 3:
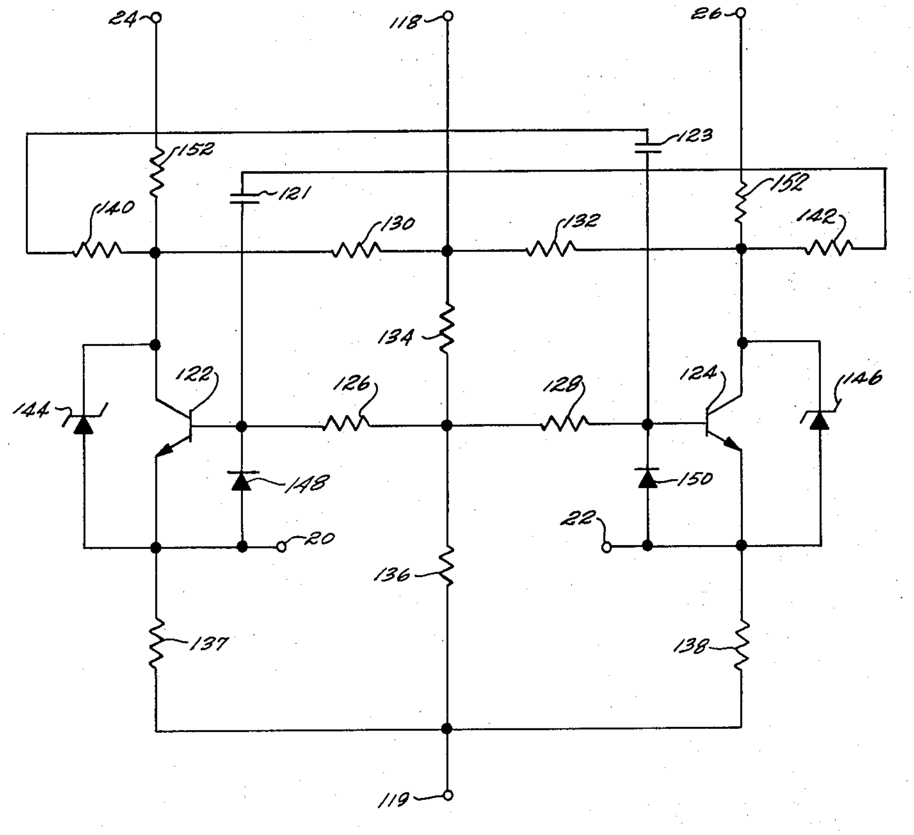
FIG. 3 is a schematic diagram of a negative impedance converter for use in the active shunt impedance compensating circuit of FIG. 2.

Refer now to FIGS. 2 and 3 and consider the actual disclosed negative impedance converter 14. The NIC 14 is a negative impedance converter of the general type disclosed and described as a short circuit, stable negative impedance converter in the above-reference IRE article Negative-Impedance Converters, by J. G. Linvill. Note in particular FIGS. 3*a* and 3b of the IRE article and the corresponding description.

FIG. 3 shows a specific short circuit stable negative impedance converter for use as the NIC 14 in FIG. 2. The NIC of FIG. 3 comprises transistors 122, 124, and resistors 126 through 138 connected essentially identical to the circuit shown in FIG. 3*a* of the above-referenced IRE article.

In addition to the elements shown in FIG. 3 of the above-referenced Proceedings of the IRE, diodes 144, 146, 148, and 150 and resistors 140, 142, 152, and 154 are added to the circuit of FIG. 3 as shown herein. The diodes 144 and 146 limit the forward voltage from the collector to emitter electrodes of transistors 122 and 124. The diodes 148 and 150 limit the negative potential applied between the emitter and base electrodes of the transistors 122 and 124. The resistors 140 and 142 limit the forward base current during lightening strikes and resistors 152 and 154 limit the current flowing between terminals 24 and 26 due to applied signals on the transmission line 10 and also help determine the negative impedance between terminals 24 and 26.

The power is applied between terminals 118 and 119 by a disabler switching circuit 120. The disabler switching circuit 120 is a conventional switch used to connect terminal 118 to ground or disconnect it from ground, the latter condition disabling the NIC 14. Power is applied whenever the NIC 14 is in use. The terminal 119 is connected to a negative source of potential −V.

Preferably the value of the series connected impedances 32, 34, and 36 are selected to attenuate signals having frequencies 1kHz and below, whereas the value of the series connected impedances 22 and 28 in combination with the NIC are selected to provide gain to signals above 1kHz. As a result, a substantially flat gain for signals with frequencies of from 300 to 3,000 cycles may be achieved with return losses typically better than 35dB.

Although an exemplary embodiment of the invention has been disclosed for purposes of illustration, it will be understood that various changes, modifications, and substitutions may be incorporated in such embodiment without departing from the spirit of the invention as defined by the claims appearing hereinafter.

What is claimed is:

1. Active shunt impedance compensating circuit for a two wire transmission line comprising:

a. a pair of output terminals for connecting across such transmission line;

b. a negative impedance converter having a negative impedance circuit connecting side and a positive impedance circuit connecting side, the positive impedance circuit connecting side being coupled across said pair of output terminals;

c. first series connected resistance and capacitance impedance elements connected across said negative impedance circuit connecting side;

d. second series connected resistance, capacitance and inductance impedance elements connected across said positive impedance circuit connecting side; and e. said negative impedance converter forming, across said output terminals an equivalent circuit with impedance substantially equal to the negative of said first series connected impedance elements in parallel with said second series connected impedance elements.

2. A circuit according to claim 1 wherein said negative impedance converter comprises a first pair of terminals across which is coupled said first series connected impedance elements and a second pair of terminals across which is coupled said second series connected impedance elements.

3. A circuit according to claim 1 wherein each of said impedance elements is variable.

4. A circuit according to claim 3 comprising switching means for varying the value of said impedance elements in the series connection.

5. A circuit according to claim 4 wherein said capacitance impedance elements of each of said first and second series connected impedance elements comprise a plurality of capacitors and switching means for selectively coupling variable numbers of said plurality of capacitors into parallel circuit relation with respect to each other and into the respective series connection.

6. A circuit according to claim 4 wherein said resistive impedance element of each series connection comprises a plurality of resistors and switching means for coupling variable members of said plurality of resistors in series.

7. A circuit according to claim 4 wherein said inductive impedance element comprises inductive means having a plurality of terminals and switching means for coupling different combinations of terminals into series circuit relation in said first series connection.

8. A circuit according to claim 1 wherein the said first series connected impedance elements are adapted to substantially attenuate signals having a frequency below a predetermined value and the second series connected impedance elements in combination with said negative impedance converter substantially increase amplitude of signals as frequency thereof increases above said predetermined value.

9. In combination: a two wire transmission line having a predetermined frequency band of signal transmission, an active shunt impedance compensating circuit for said transmission line comprising:

a. a pair of output terminals for connecting across such transmission line;

b. a negative impedance converter having a negative impedance circuit connecting side and a positive impedance circuit connecting side, the positive impedance circuit connecting side being coupled across said pair of output terminals;

c. first series connected resistance and capacitance impedance elements connected across said negative impedance circuit connecting side;

d. second series connected resistance, capacitance and inductance impedance elements connected across said positive impedance circuit connecting side; and e. said negative impedance converter forming, across said output terminals, an equivalent circuit substantially equal to the negative of said first series connected impedance elements in parallel with said second series connected impedance elements.

10. A circuit according to claim 9 wherein said negative impedance converter comprises a first pair of terminals across which is coupled said first series connected impedance elements and a second pair of terminals across which is coupled said second series connected impedance elements.

11. A circuit according to claim 9 wherein each of said impedance elements is variable.

12. A circuit according to claim 11 comprising switching means for varying the value of said impedance elements in the series connection.

13. A circuit according to claim 11 wherein said capacitance impedance elements of each of said first and second series connected impedance elements comprise a plurality of capacitors and switching means for selectively coupling variable numbers of said plurality of capacitors in parallel circuit relation with respect to each other and into the respective series connection.

14. A circuit according to claim 11 wherein said resistive impedance element of each series connection comprises a plurality of resistors and switching means for coupling variable members of said plurality of resistors in series.

15. A circuit according to claim 11 wherein said inductive impedance element comprises inductive means having a plurality of terminals and switching means for coupling different combinations of terminals into series circuit relation in said first series connection.

16. A circuit according to claim 9 wherein the said first series connected impedance elements are adapted to substantially attenuate signals having a frequency below a predetermined value and the second series connected impedance elements in combination with said negative impedance converter substantially increase amplitude of signals as frequency thereof increases above said predetermined value.

17. In combination: a two wire transmission line having a predetermined frequency band of signal transmission;

an active shunt impedance compensating circuit for said transmission line comprising:

a. a pair of output terminals for connecting across the two wire transmission line;

b. a negative impedance converter having negative impedance circuit side and positive impedance circuit side, the positive impedance circuit side being coupled across said pair of output terminals;

c. first impedance $Z1 = a_1(s + a_2)/s$ coupled across said negative impedance circuit connecting side and wherein $s = j\omega$ and $a_1$, $a_2$ are + constants;

d. a second impedance $Z2 = a_3(s^3 + a_4 s + a_5)/s$ coupled across said positive impedance circuit connecting side and wherein $s = j\omega$ and $a_3$, $a_4$ and $a_5$ are positive constants;

e. said negative impedance converter forming, across said output terminals, an equivalent circuit substantially equal to the negative of Z1 in parallel with Z2, and the parallel combination of Z1 and Z2 with said two wire transmission line forms an impedance characterized as 900 ohms in series with 2 $\mu$f capacitance.

18. The combination of claim 17 wherein $a_1$ is resistance R1; $a_2 = 1/R1C1$, wherein $C1$ is capacitance; $a_3$ is inductance L; $a_4 = R2/L$ where $R2$ is resistance; and $a_5 = 1/LC2$ where C2 is capacitance.

19. The combination of claim 18 wherein R1 and C1 are coupled in series across said negative impedance circuit connecting side and wherein R2, L and C2 are coupled in series across said positive impedance circuit connecting side.

20. A circuit according to claim 17 wherein the said impedance is adapted to substantially attenuate signals having a frequency below a predetermined value and the second impedance in combination with said negative impedance converter substantially increase amplitude of signals as frequency thereof increases above said predetermined value.

* * * * *

PO-1050
(5/69)

UNITED STATES PATENT OFFICE
CERTIFICATE OF CORRECTION

Patent No. 3,814,867 Dated June 4, 1974

Inventor(s) C. Wendell Boucher

It is certified that error appears in the above-identified patent and that said Letters Patent are hereby corrected as shown below:

Col. 1, line 10, "formed" should be --forms--;

Col. 1, line 49, "maufactured" should be --manufactured--;

Col. 5, line 37, "incombination" should be --in combination--.

Signed and sealed this 8th day of October 1974.

(SEAL)
Attest:

McCOY M. GIBSON JR.
Attesting Officer

C. MARSHALL DANN
Commissioner of Patents